(12) United States Patent
De Luca (10) Patent No.: US 9,836,930 B2
(45) Date of Patent: Dec. 5, 2017

(54) METHOD OF MAKING AND USING A TACTILE ARRAY DEVICE

(71) Applicant: Create Technologies, Inc., Carson City, NV (US)

(72) Inventor: Nicholas P. De Luca, Carmel-by-the-Sea, CA (US)

(73) Assignee: Create Technologies, Inc., Carson City, NV (US)

( * ) Notice: Subject to any disclaimer, the term of this patent is extended or adjusted under 35 U.S.C. 154(b) by 0 days.

(21) Appl. No.: 14/986,415

(22) Filed: Dec. 31, 2015

(65) Prior Publication Data
US 2017/0193766 A1    Jul. 6, 2017

(51) Int. Cl.
  *G08B 6/00*    (2006.01)
  *G06F 3/01*    (2006.01)
(52) U.S. Cl.
  CPC .............. *G08B 6/00* (2013.01); *G06F 3/016* (2013.01)
(58) Field of Classification Search
  USPC .............................................. 340/407.1, 4.12
  See application file for complete search history.

(56) References Cited

U.S. PATENT DOCUMENTS

| | | | | |
|---|---|---|---|---|
| 4,810,996 A * | 3/1989 | Glen | ........................ | G08B 3/10 340/321 |
| 6,026,684 A * | 2/2000 | Calder | ................. | A63B 21/028 73/379.02 |
| 9,035,899 B2 * | 5/2015 | Modarres | ................. | G06F 3/016 178/18.01 |
| 2004/0056876 A1 * | 3/2004 | Nakajima | ............. | G06F 3/0488 715/702 |
| 2004/0143212 A1 * | 7/2004 | Trombley, III | ........ | A61M 5/007 604/65 |
| 2004/0207542 A1 * | 10/2004 | Chang | ...................... | G06F 3/016 341/20 |
| 2005/0230575 A1 * | 10/2005 | Zelenski | ............... | A61G 7/0503 248/176.1 |
| 2007/0163259 A1 * | 7/2007 | Webster | ................... | B62D 3/14 60/623 |
| 2008/0052837 A1 * | 3/2008 | Blumberg | ............ | A47C 23/002 5/727 |

(Continued)

OTHER PUBLICATIONS

International Search Report for corresponding PCT Application PCT/US16/69421.

*Primary Examiner* — Fekadeselassie Girma
(74) *Attorney, Agent, or Firm* — Capitol City TechLaw; Jasbir Singh (57) ABSTRACT

A device for communicating a physical touch is disclosed. The device including: an array of pistons numbering greater than 25 per square inch, each piston having a contact surface; an actuator array to independently move each piston; and a controller to determine a depth position of each piston in the array of pistons, wherein each of the pistons comprises a cylinder and a pin disposed in the cylinder. The device may be used with a communication system including a high speed data transmission and sensory system to reproduce the sensation of touch by translating an actuation of the array pins. The actuation may be affected by a controlled continuous transfer of a fluid between pressure zones. Additional sensory effects including texture, softness, humidity, chemistry and temperature may be transmittable through the device.

26 Claims, 7 Drawing Sheets

(56) References Cited

U.S. PATENT DOCUMENTS

| | | | | |
|---|---|---|---|---|
| 2008/0086087 A1* | 4/2008 | Spohn | ............... | A61M 5/007 604/151 |
| 2008/0126882 A1* | 5/2008 | Fulton | ............... | G05B 19/058 714/48 |
| 2008/0306436 A1* | 12/2008 | Edwards | ............... | A61M 5/19 604/67 |
| 2008/0314807 A1* | 12/2008 | Junghanns | ............... | B01D 61/025 210/85 |
| 2009/0208385 A1* | 8/2009 | Howorth | ............... | A61M 5/007 422/179 |
| 2012/0113053 A1* | 5/2012 | Cato | ............... | G01P 5/08 345/174 |
| 2014/0330243 A1* | 11/2014 | Kietzmann | ............... | A61M 5/24 604/500 |
| 2015/0217843 A1* | 8/2015 | Leinikki | ............... | B63C 11/02 345/174 |
| 2016/0296838 A1* | 10/2016 | Goetgeluk | ............... | A63F 13/285 |

\* cited by examiner

METHOD OF MAKING AND USING A TACTILE ARRAY DEVICE

FIELD

The present disclosure teaches a device for communicating a physical touch. The device includes an array of closely nested pistons or pins that move in response to feedback and communication from a touch or a secondary sensing device. The device may be used with a communication system including a high speed data transmission and sensory system to reproduce the sensation of touch by translating an actuation of the array pins. The actuation may be affected by a controlled continuous transfer of a fluid between pressure zones. Additional sensory effects including texture, softness, humidity, chemistry and temperature may be transmittable through the device.

BACKGROUND

The transmission of touch between two or more individuals or objects over distance has a multitude of uses within home, health care, commercial, and industrial settings. Mandayam A Srinivasan, Director Laboratory for Human and Machine Haptics at the Massachusetts Institute of Technology, has described the field of haptic technologies (touch technologies) as being divisible into three basic segments, namely:

Human haptics—the study of human sensing and manipulation through touch,

Machine haptics—the design, construction, and use of machines to replace or augment human touch.

Computer haptics—algorithms and software associated with generating and rendering the touch and feel of virtual objects (analogous to computer graphics).

With the growth and ability to process and transmit information faster, the potential for commercializing haptic technologies has expanded. Haptic or kinesthetic communications with force feedback systems have included various forms of tactile communication including vibratory, translation, or pressurization. Commercial products that have included these systems include video games, mobile devices, medical equipment, airplanes, and robotics.

Sensory touch comes from a multitude of inputs including skin. The skin as well as underlying fat and bones in the body may provide input to the sensory touch. Haptic communications with hands are very complex. For example, hands may detect and communicate surface texture, grip, softness, humidity, vibrational movements, and chemistry such as salinity, temperature. Vibrational movements may include small vibrational movements (for example, on the scale of about 0 mm to about 0.5 mm), small motions (for example, from 0.5 mm to about 10 mm) and large motions (for example, motions greater than about 10 mm).

In the prior art, devices have been created that allow for the transmission of various degrees of motions. However, prior art devices do not allow for the combined transmission of touch through the gradations of scale. As such, the creation of a device that easily transmits all forms of haptic communications and is easily manufactured for general use has not been accomplished thus far.

U.S. Pat. No. 3,780,225 by Shannon describes a tactile grip communication device intended for individuals who are deaf and wherein a closed loop communication is established over telephone lines for converting an electrical signal to a pressurized medium. As an individual squeezes or pushes said devices, the pressure is converted to an electrical signal which is then transmitted to the secondary device and a response signal is returned based on the pressure exerted by the secondary device to create equilibrium. This single device can only transmit sensation to the entire hand and cannot therefore transmit the sensory details that multiple miniature devices could transmit.

U.S. Pat. No. 8,378,797 by Pance et al. describes a vibrational localized haptic device which includes multiple vibrational actuators. While vibration can simulate the sensation of delicate touch, it cannot transmit the associated feelings of grasping or of larger motions on the scales of 0.5-20 mm. Further, translational larger movements cannot be duplicated with such a system.

U.S. Pat. No. 9,035,899 by Modarres et al describes a piezo electric haptic device wherein the piezoelectric is embedded within a polymer matrix to create texture. The creation of a texture for haptics has tremendous value but does allow for the transmission of larger scale movements on the order of 0.5-20 mm as well as other sensory qualities such as softness, humidity, chemistry such as salinity, and temperature as the polymer matrix embeds the entirety of the actuator.

Daniel Leithinger, Sean Follmer, and Hiroshi Ishii at the Massachusetts Institute of Technology have developed a haptic pin pad device that use electromechanical means of moving large block pins based on three dimensional computation and detection. The system is not collinear with respect to the actuator system and the pins and thus has a large footprint which would not be easily manufactured into a consumer device.

SUMMARY

The present teachings provide embodiments of a device to sense a physicla touch and to communicate the touch, and features thereof, which offer various benefits. The system can employ multiple devices, systems, operations, and the like to promote safe, efficient, and effective use of the devices and methods disclosed herein.

A device for communicating a physical touch is disclosed. The The device including: an array of pistons numbering greater than 25 per square inch, each piston having a contact surface; an actuator array to independently move each piston; and a controller to determine a depth position of each piston in the array of pistons, wherein each of the pistons comprises a cylinder and a pin disposed in the cylinder.

A process for communicating the sense of touch between two devices is disclosed. The process including: providing a primary device comprising an array of primary pistons and an array of primary valves, wherein the primary pistons are independently movable and have a density greater than 25 pistons per inch squared; providing a secondary device comprising an array of secondary pistons and an array of secondary valves, wherein the secondary pistons are independently movable; detecting a position of each primary piston; transmitting each primary piston's position to the secondary device; manipulating each secondary valve on the secondary device to achieve a matching equilibrium between each primary piston's position and a corresponding secondary piston's position; detecting a position of each secondary piston; transmitting each secondary piston's position to the primary device; and manipulating each primary valve on the primary device to achieve a matching equilibrium between each primary piston's position and a corresponding secondary piston's position.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention, and together with the description serve to explain the principles of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DESCRIPTION

The present teachings disclose a device for efficiently communicating a touch input. The present teachings also disclose a process to replicate a touch input wherein touch generation is remote from the touch replication.

The current teachings allow for the manufacture of an inexpensive haptic device that is capable of communicating small vibrational movements (on the scale of 0-0.5 mm) as well as small motions 0.5-10 mm and large motions greater than 10 mm.

The current teachings disclose a device having a pin density of greater than 25 pins per square inch and that each pin be independently controllable and have sensory capability.

The current teachings disclose a haptic device capable of communicating surface texture, grip, softness, humidity, and chemistry including salinity, temperature, and color.

The current teachings disclose a haptic device capable of interfacing with a computational haptic simulator.

The current teachings disclose a haptic device that can be manufactured using standard semiconductor printed circuit board techniques.

The current teachings disclose a haptic system that can be easily modularized.

The current teachings disclose a haptic system that can be easily integrated within contoured surfaces.

The current teachings disclose a haptic device that allows for the measurement of lateral load.

According to various embodiments, a haptic feedback device includes an array of movable pins with the array having a pin density of greater than 25 per square inch, a pressurized fluid reservoir separated by a plurality of valves collinearly disposed between the pressurized fluid reservoir and one of the pins in the array, a drain reservoir, sensors to monitor and detect a position of each of the pins, a receiving and transmitting processor, an elastic membrane on each of the pins, and a pin return mechanism.

According to various embodiments, a process of communicating the sense of touch includes: detecting a position of each pin or piston in the array in a primary device; transmitting the position of each of the pins of the primary device to a secondary device; detecting, in the secondary device, a corresponding position of a pin or piston of the pins in the secondary device; transmitting, from the secondary device, the corresponding position to the primary device; manipulating, on the primary device, a fill or drain valve to achieve a matching position equilibrium based on the corresponding position; and repeating.

According to various embodiments, the primary and secondary may include piezo electric valves and pressurized fluid passing through the valves, into the pistons, and out of the pistons based on the relative position and feedback of the corresponding device or a simulation device. Additional sensory effects included in the sense of touch include, but are not limited to, texture, softness, humidity, chemistry and temperature transmittable through each of or through a group of pins.

Figure 1:
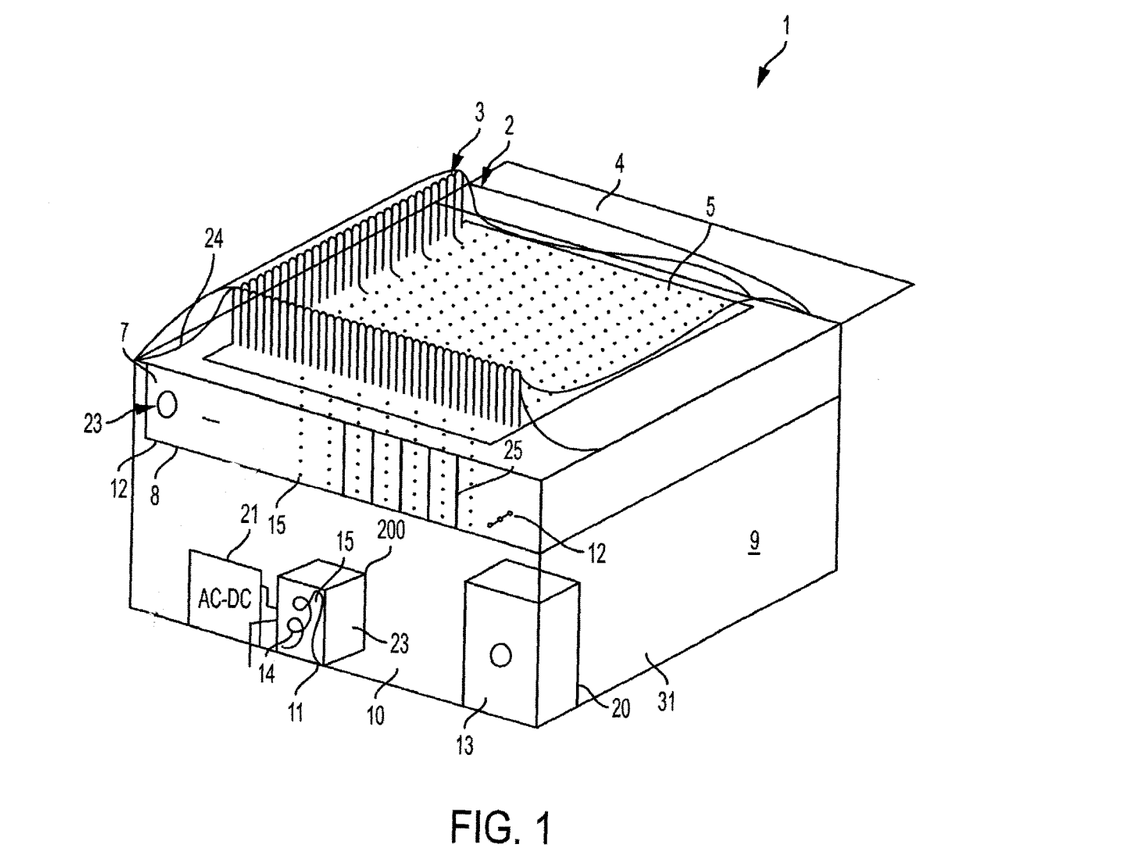
FIG. 1 illustrates an isometric view of a haptic pin pad with a collinear actuation system and a fluid reservoir, according to various embodiments.

FIG. 1 illustrates an isometric view of a haptic pin pad with a collinear actuation system and a fluid reservoir, according to various embodiments.

FIG. 1 illustrates a communicative tactile array device 1 with an array 2 of pins 3, 6 protruding through a planar surface 4 at perforations 5. According to various embodiments, the perforations 5 may number greater than 25 per square inch, may number greater than 35 per square inch, may number greater than 45 per square inch, or the like. The perforations 5 may be disposed in a primary surface 4 of a substrate. Each of the perforations 5 may be used for the pin 3, 6 to protrude therefrom. In some embodiments, the number of perforations 5 may provide a proper resolution for a haptic interface. Each pin 6 may move within an individual cell block 25 within an assembled block 7.

Figure 2:
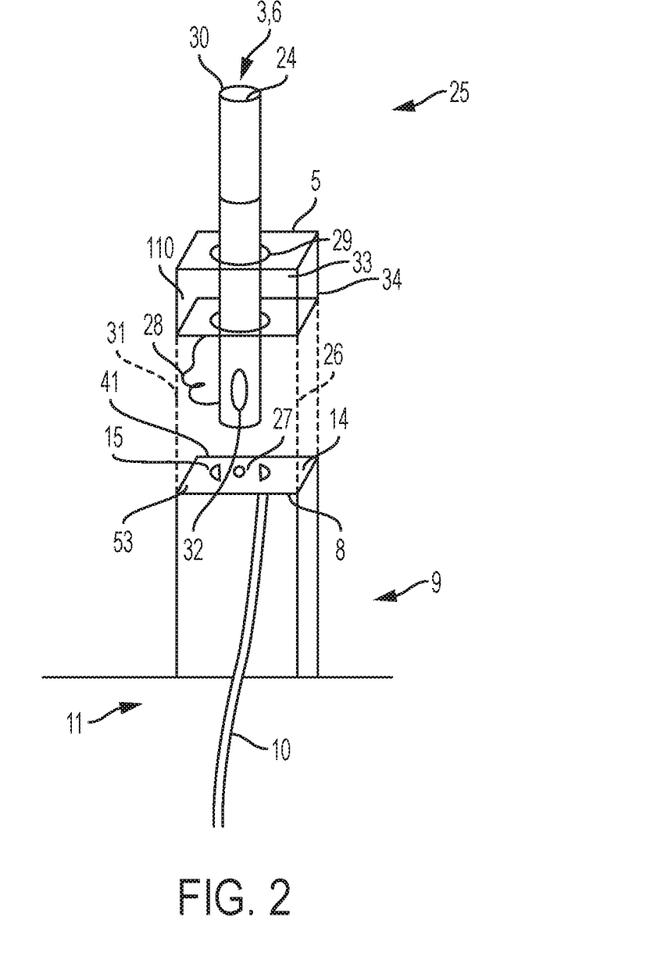
FIG. 2 illustrates an isometric view of single modular pin of the haptic device of FIG. 1, according to various embodiments.

In some embodiments, an array of valves 12 may be connected to pins 3 (6) disposed in an assembled block 7 (See FIG. 2). In some embodiments, the array of valves 12 may be disposed on a Printed Circuit Board (PCB) 8. Each of the cell blocks 25 is pressurized through a corresponding valve in the array of valves 12. Each of the cell blocks 25 may include an inlet valve 15 that allows for pressurized fluid 31 from pressurized reservoir 9 into individual cell block 25 and an outlet valve 14 draining pressure of the cell through channel 10 to a drain reservoir 11 which may be the environment or atmosphere. Pump 22 pressurizing fluid 31 through filter 200 into reservoir 9 and power generally delivered through an AC wall adapter 20 or a mobile battery source. The cell block 25 may include a spring or elastic 28 (FIG. 2) that returns the piston or pin 3 to a neutral rest position. A power source 21 further used to power system 1 to allow for the use of piezo electric valves which may operate at high voltage. Using a cellular block approach and a printed circuit board allows for ease of production.

The device 1 may include a communications device 23, such as, a Bluetooth transceiver, a wireless network transceiver, a wired network connector, or the like. The device 1 may include a controller 13. The controller 13 may control the actuator or valve array 12 to adjust the depth position of a corresponding pin in response to an input received over a communications device 23. The controller 13 collects various touch data collected by the sensors of the device 1. The touch data may include the depth position of pin 3 (6), surface texture, grip, softness, humidity, and chemistry including salinity, temperature, color, and the like of the object being sensed. In some embodiments, the controller 13 may manipulate the valves of the valve array 12 to maintain the pins 3 (6) in a rest or equilibrium position.

In some embodiments, the rest position may be halfway along a length of the pin 3 (6). In some embodiments, the rest position may be the pin 3 (6) fully extended from the primary surface 4 away from the valve array 12. In exemplary embodiments, the pins 3 (6) may be independently movable 0.125 inches or less, 0.25 inches or less, or the like. The pins 3 (6) may be electronically controlled via the actuator or valve array 12.

FIG. 2 illustrates an isometric view of single modular pin of the haptic device of FIG. 1, according to various embodiments.

FIG. 2 illustrates cell block 25 with a collinear actuation of pin(s) 6(3)—which may be hollow but generally capped, for example, to allow for actuation by pressure buildup within zone 7 of each block 25. In some embodiments, one end of the pin 6 (3) may provide a contact surface. In some embodiments, the contact surface of pin 6 (3) may be covered with a membrane 24. Piston 6 may move through perforation 5. The perforation 5 may have a bearing surface 29 to allow for smooth movement. In some embodiments, the valve 15 may allow pressurization from chamber 9 with fluid 3. In some embodiments, valve 14 may allow depressurization through channel 10 to a reservoir such as atmosphere 11. In exemplary embodiments, valve 14 and valve 15 may both be located on a printed circuit board 8. A heater for pin 6 may be located directly on pin 6 (3) or on the bearing block 110. Lateral forces may also be measured at block 110 or by the deflection of pin 6 using a strain gauge 34. A temperature sensor 32 may also be located on the pin 6 or the data may be acquired using an infrared sensor. As communication occurs from a haptic device, a constant feedback maybe provided and the pin position may continuously be monitored using a distance sensor, such as, a photonic sensor 27 and a reflective surface 26. Miniature linear slides (not shown) could also be used to monitor position of the pin 6. A connector 53 may allow for direct contact to sensors such as moisture sensors which may move with the pin 6 and then connect to the PCB board 8.

Figure 3A:
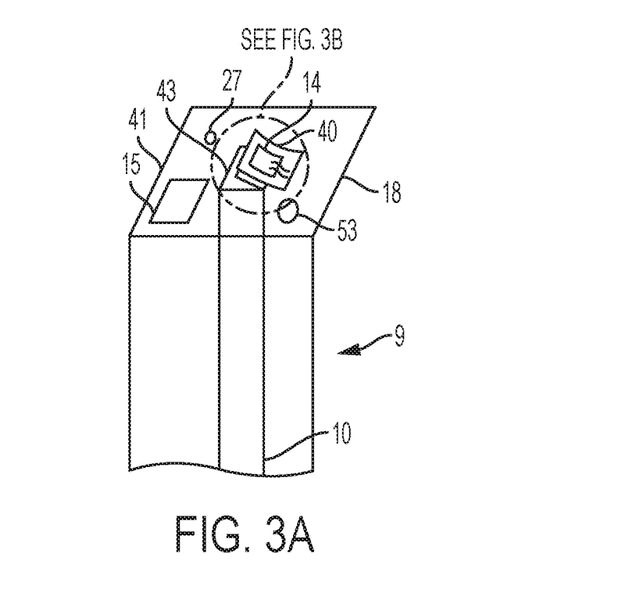
FIG. 3a illustrates an isometric view of a piezo electric fluid valve, according to various embodiments.

FIG. 3a illustrates an isometric view of a piezo electric fluid valve, according to various embodiments.

FIG. 3a is a close up isometric view of a valve cell 4151 512, 8 for cell block 25, includes valves 14 and 15 as well as a photo sensor 27, a contact 53 and a piezo electric 40 that acts as an actuator. Valve 15 may allow fluid pressure in from reservoir 9, while valve 14 may allow fluid to escape through opening 43 and out channel 10 which passes through but is isolated from chamber 9.

Figure 3B:
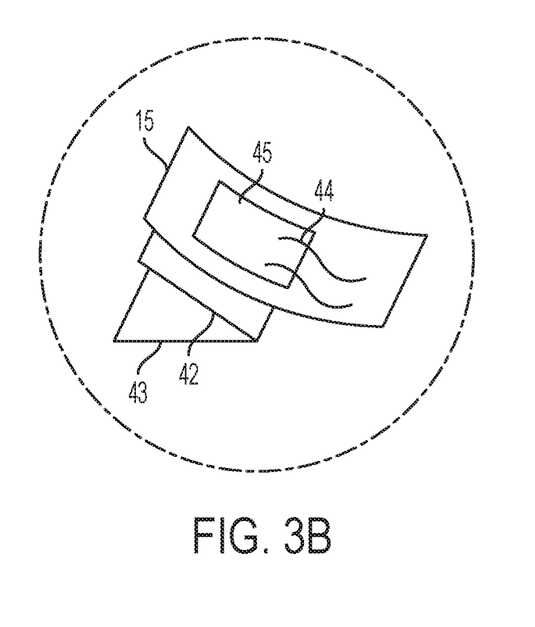
FIG. 3b illustrates a close up view of the valve of FIG. 3a, according to various embodiments.

FIG. 3b illustrates a close up view of the valve of FIG. 3a, according to various embodiments.

FIG. 3b is a close up of valve 15 with a membrane 45 that bends from the board 8 due to a voltage applied through wires 44. As membrane 45 moves upwards a sealant lining 42, which may be silicone, lifts off of opening 43 and allows passage of fluid or air. Although membrane 45 may bend as a single flap to form a valve, other valve forms may include multiple flaps that seal together to form a valve and may be powered by multiple actuators including piezo electrics.

Figure 4:
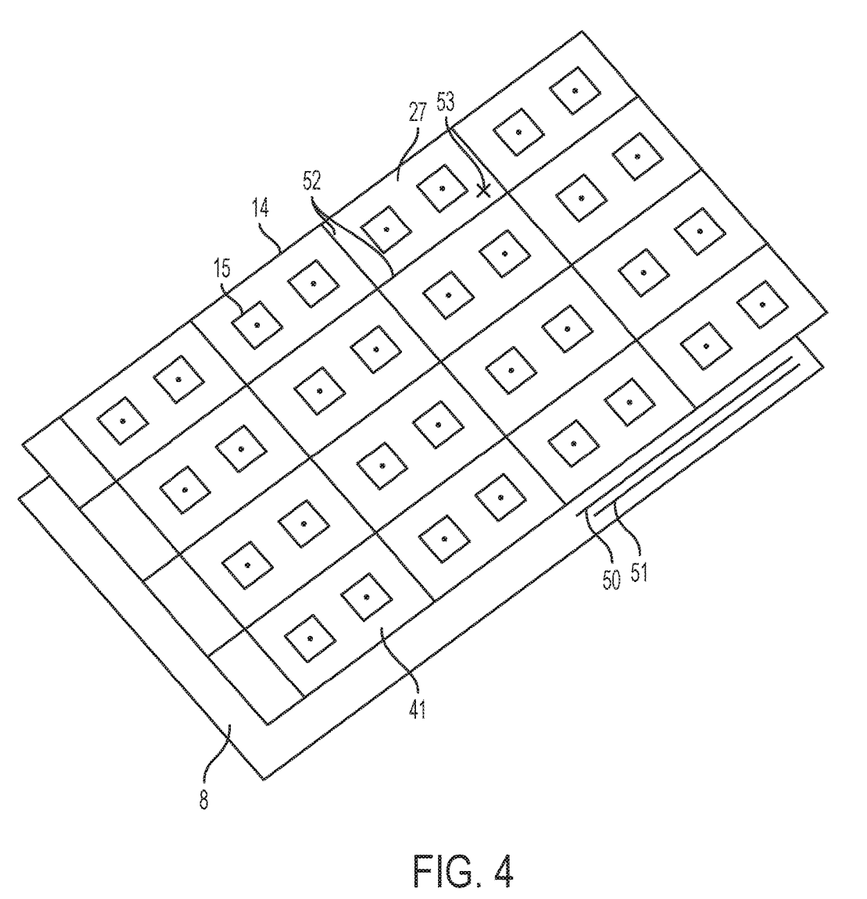
FIG. 4 illustrates a planar view of the primary valve board integrating piezo electric fluid valves within a multiple layer PCB board, according to various embodiments.

FIG. 4 illustrates a planar view of the primary valve board integrating piezo electric fluid valves within a multiple layer PCB board, according to various embodiments.

FIG. 4 is an isometric view of a PCB 8 used in the tactile communication device 1 of FIG. 1 further illustrating cell blocks 25, 41 positioned in an array on board 8 including valves 14 and 15 in each cell block 25, 41. PCB board 8 may have multiple layers 50 and 51 to allow for very close nesting of wiring 44. Photovoltaics 27 and contactor 53 may be located on PCB 8. A gasket 52 may allow for the separation of individual cell blocks 25, 41 so that the level of pressurization is localized in each block.

Figure 5:
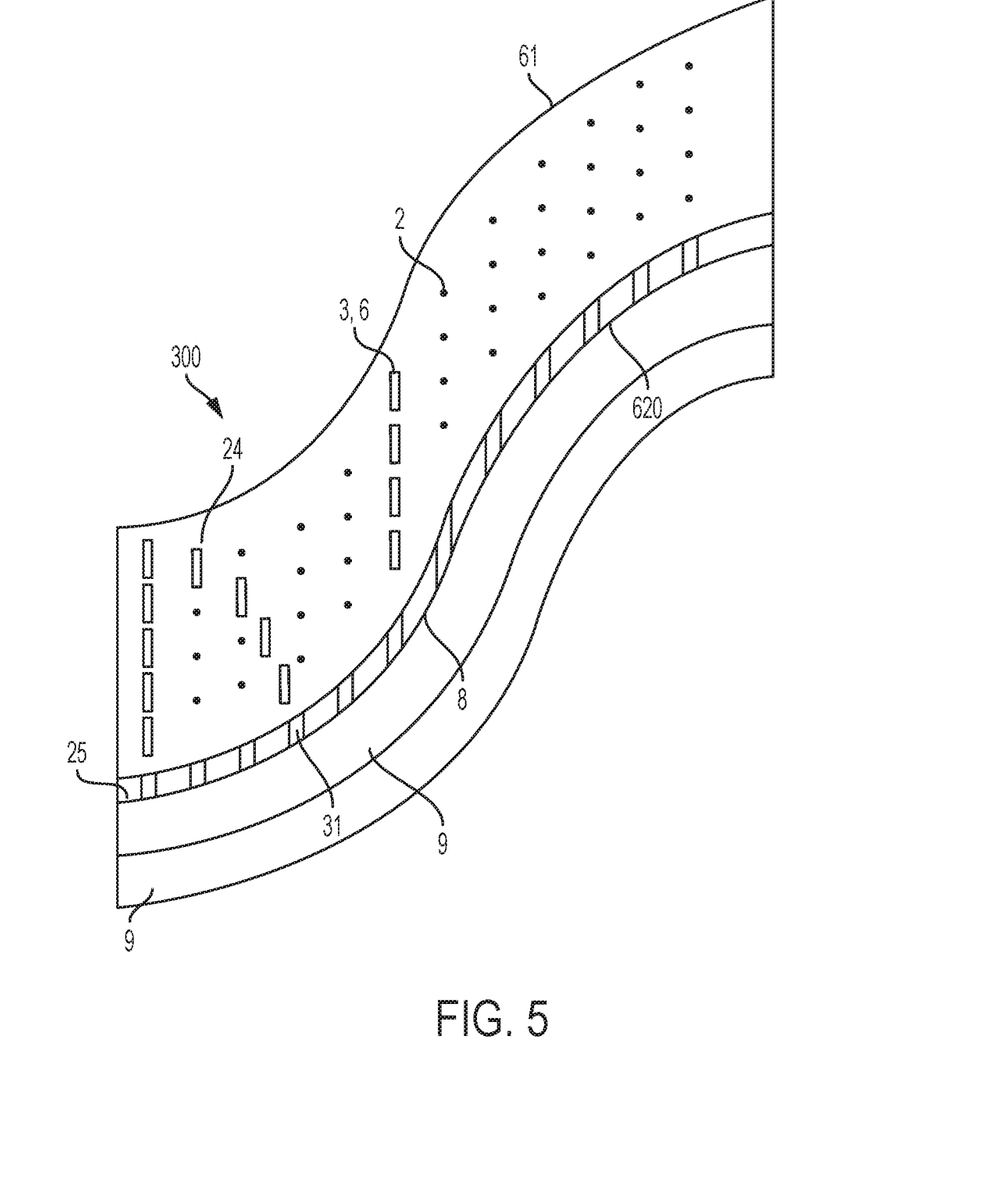
FIG. 5 illustrates an isometric view of a non-planar haptic pin pad with a collinear actuation system, according to various embodiments.

FIG. 5 illustrates an isometric view of a non-planar haptic pin pad with a collinear actuation system, according to various embodiments.

FIG. 5 is an isometric view of a non-planar haptic pin pad 300 with a collinear actuation from pins 3 in array 2 of surface 4 curved into surface 61. Reservoir 9 may be contoured to match surface 61. In some embodiments, PCB 8 may be contoured using flexible substrates to match surface 61. Membrane 24 may include additional piezo electrics to allow for the creation of a surface texture.

Figure 6:
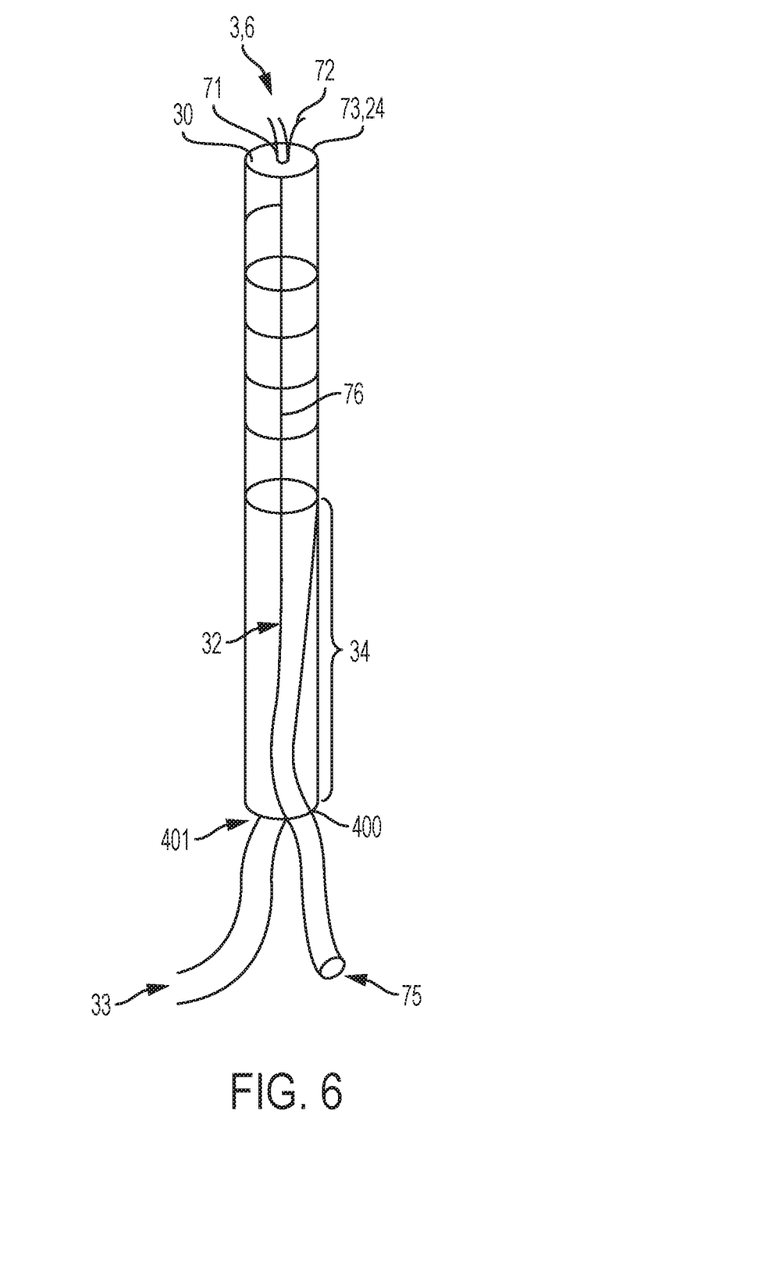
FIG. 6 illustrates an isometric view of a pin of the haptic device of FIG. 1 including other sensory elements such as temperature, humidity, and chemical interface.

FIG. 6 illustrates an isometric view of a pin of the haptic device of FIG. 1 including other sensory elements such as temperature, humidity, and chemical interface.

FIG. 6 illustrates details of pin 6 to allow for additional communication of chemistry such as salinity or moisture 72 by passing fluid through pin 3 via channel 76 with pump 75. In cases that a hollow pin 6 is used to carry moisture, a bottom cap at 400 is required to allow for pressure buildup in each cell block 25. The top surface 24 of pin 3 having texture 73 and coloring 30, both which may adapt based on the feedback of the environment or the conditions communicated by an auxiliary secondary device such as a haptic pin pad as herein disclosed or a simulated computational haptic interface. Strain gauge 34 may be located on pin 6 as well as a heater 33 and temperature sensor 32 also responding to the environment or the conditions communicated by an auxiliary secondary device such as a haptic pin pad as herein disclosed or a simulated computational haptic interface.

In exemplary embodiments, a subset of pins 6 (3) in an array of pins may include an ambient sensor, a plurality of ambient sensors, or no sensors therein. The ambient sensors may sense humidity, chemistry, surface texture, lateral load, shade/coloring, temperature, or the like.

In exemplary embodiments, a subset of pins 6 (3) in an array of pins may include a device to replicate an ambient condition. The devices to replicate an ambient condition may provide heating, cooling, surface texture, lateral load, humidity or the like.

Figure 7:
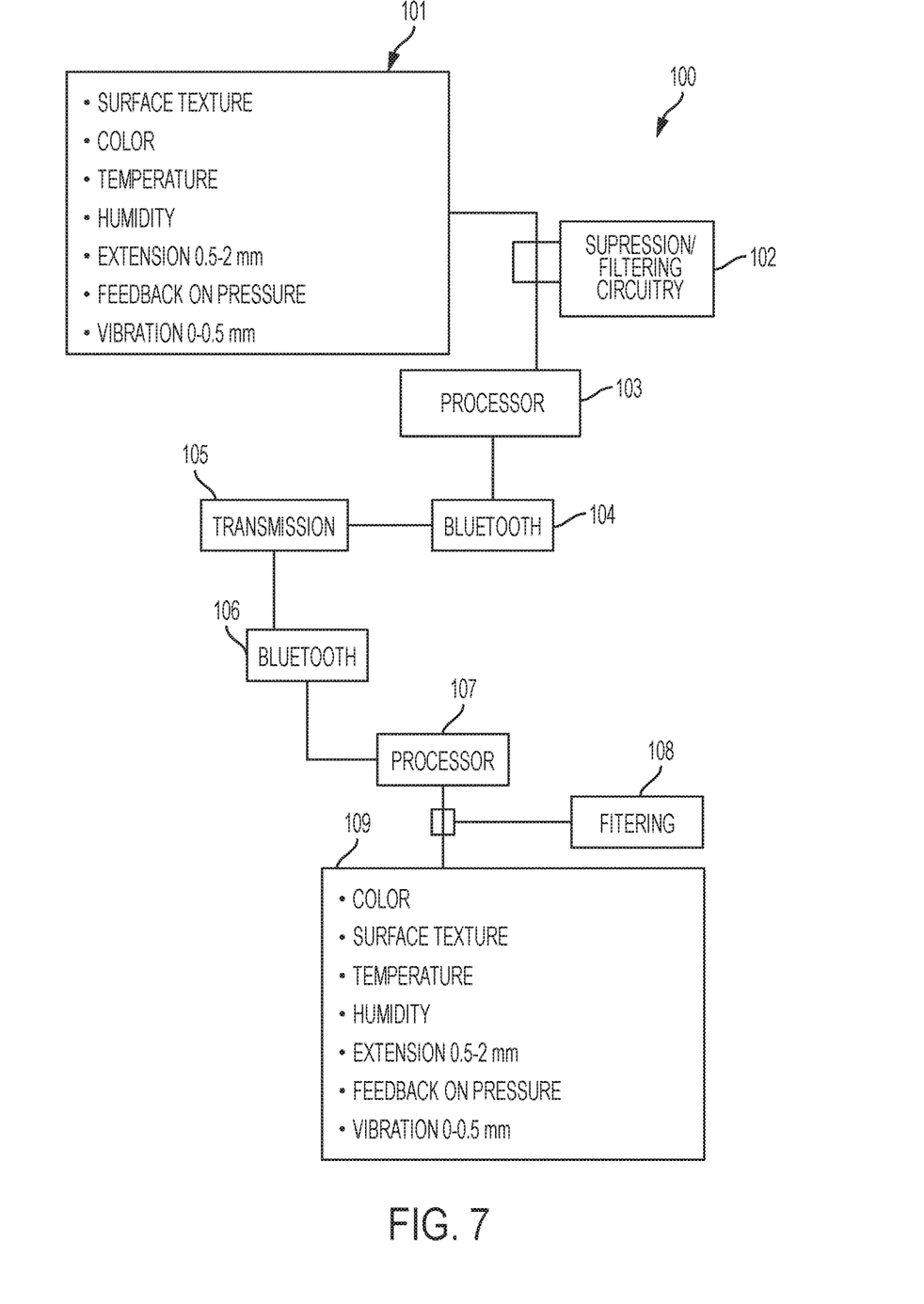
FIG. 7 is a schematic diagram illustrating the process of communication between two or more haptic pin pads.

FIG. 7 is a schematic diagram illustrating the process of communication between two or more haptic pin pads.

FIG. 7 illustrates a process of communicating between a haptic pin pad 1 as herein disclosed and a secondary pad or a simulated computational haptic interface. Wherein the process of communicating the sense of touch between two devices involves the process of detecting the initial conditions 101 including the position of each piston filtering this information via low pass and high pass filters 102, further at 103 processing and analyzing the information generally with a microprocessor, transmitting said information 105 and transmitting said position and other information to a secondary device, for example, by wireless means 104 to a cell phone or other communication device also including the internet. A similar haptic pad, receives the information about the primary pad through transmission 105 and 106, and processes this at 107 by incorporating the filtered data 109 and 108 and then outputs a signal to adjust the valves including transmitting said position to the primary device, opening or closing a fill or drain valve on the primary device to achieve a matching equilibrium, and repeating.

The examples presented herein are intended to illustrate potential and specific implementations. It can be appreciated that the examples are intended primarily for purposes of illustration for those skilled in the art. The diagrams depicted herein are provided by way of example. There can be variations to these diagrams or the operations described herein without departing from the spirit of the invention. For instance, in certain cases, method steps or operations can be performed in differing order, or operations can be added, deleted or modified.

What is claimed is:

1. A device for communicating a physical touch comprising:
   an array of pistons numbering greater than 25 per square inch, each piston having a contact surface;
   an actuator array to independently move each piston;
   a controller to determine a depth position of each piston in the array of pistons; and
   a membrane disposed over the contact surface of each of the pistons, wherein the membrane has a durometer between 0 to 100 shore 00,
   wherein each of the pistons comprises a cylinder and a pin disposed in the cylinder.

2. The device of claim 1, further comprising a sensor to detect the depth position of each piston.

3. The device of claim 1, further comprising a fluid pump to transfer a fluid into and out of each of the pistons in the array to control a motion of each of the pistons.

4. The device of claim 3, wherein the fluid transferred into each piston comes from a common pressurized source.

5. The device of claim 3, wherein the fluid transferred out of each piston leads to a common reservoir.

6. The device of claim 3, wherein the transfer of fluid into and out of the piston is individually controlled by a valve.

7. The device of claim 6, wherein the valves are disposed in an array with a density of greater than 25 per square inch.

8. The device of claim 6, wherein the valves comprise piezo electrics.

9. The device of claim 6, wherein the valve comprises a drain valve, a fill valve or a combination thereof.

10. The device of claim 1, further comprising a membrane disposed over the contact surface of each of the pistons, wherein the membrane has a Young's modulus of elasticity of less than 1 GPa.

11. A device for communicating a physical touch comprising:
    an array of pistons numbering greater than 25 per square inch, each piston having a contact surface;
    an actuator array to independently move each piston;
    a controller to determine a depth position of each piston in the array of pistons; and
    a membrane disposed over the contact surface of each of the pistons, wherein said membrane comprises a piezo electric device,
    wherein each of the pistons comprises a cylinder and a pin disposed in the cylinder.

12. The device of claim 1, further comprising a plurality of springs, wherein each piston comprises a spring or elastic that returns the piston to a neutral rest position.

13. The device of claim 1, further comprising a processing device to communicate, in real-time, the depth position of each of the pistons in the array to a secondary device or processor.

14. The device of claim 1, wherein the contact surfaces of the pistons of the array of pistons are disposed in a planar shape when the array of pistons is in equilibrium.

15. The device of claim 1, wherein the contact surfaces of the pistons of the array of pistons are disposed in a non-planar shape when the array of pistons is in equilibrium.

16. The device of claim 1, wherein the number of pistons in the array of pistons is less than or equal to a number of actuators in the array of actuators.

17. The device of claim 1, further comprising a heater or cooler to provide temperature feedback and compensation through the contact surfaces of the pistons.

18. The device of claim 17, wherein the heater or cooler comprises a Peltier device.

19. A device for communicating a physical touch comprising:
    an array of pistons numbering greater than 25 per square inch, each piston having a contact surface;
    an actuator array to independently move each piston;
    a controller to determine a depth position of each piston in the array of pistons; and
    a sensor for a moisture feedback and compensation,
    wherein each of the pistons comprises a cylinder and a pin disposed in the cylinder.

20. The device of claim 1, further comprising a sensor to detect a lateral translational force as well as a vertical force applied at the contact surface of each piston.

21. The device of claim 1, further comprising a sensor to detect salinity or other chemical composition.

22. The device of claim 1, wherein the piston is hollow and comprises a sensor to detect chemical composition.

23. The device of claim 1, wherein the piston can transfer heat effectively.

24. A process for communicating the sense of touch between two devices comprising:
    providing a primary device comprising an array of primary pistons and an array of primary valves, wherein the primary pistons are independently movable and have a density greater than 25 pistons per inch squared;
    providing a secondary device comprising an array of secondary pistons and an array of secondary valves, wherein the secondary pistons are independently movable;
    detecting a position of each primary piston;
    transmitting each primary piston's position to the secondary device;
    manipulating each secondary valve on the secondary device to achieve a matching equilibrium between each primary piston's position and a corresponding secondary piston's position;
    detecting a position of each secondary piston;
    transmitting each secondary piston's position to the primary device; and
    manipulating each primary valve on the primary device to achieve a matching equilibrium between each primary piston's position and a corresponding secondary piston's position.

25. The process of claim 24, wherein the secondary device is a simulation device.

26. The process of claim 25, wherein the primary device is disposed remote from the secondary device.

* * * * *